United States Patent [19]

Sitrin

[11] Patent Number: 4,875,385
[45] Date of Patent: Oct. 24, 1989

[54] CONTROL PEDAL APPARATUS FOR A MOTOR VEHICLE

[76] Inventor: Gabriel M. Sitrin, 6127 Orchard Lake Rd., Apt. 104, West Bloomfield, Mich. 48033

[21] Appl. No.: 188,122

[22] Filed: Apr. 25, 1988

Related U.S. Application Data

[63] Continuation of Ser. No. 897,197, Aug. 18, 1986, abandoned.

[51] Int. Cl.$^4$ .............................................. G05G 1/14
[52] U.S. Cl. ........................................ 74/512; 74/513; 74/560
[58] Field of Search .................. 74/512, 513, 560, 522

[56] References Cited

U.S. PATENT DOCUMENTS

| | | | |
|---|---|---|---|
| 1,454,258 | 5/1923 | Adams | 74/513 |
| 1,929,409 | 10/1933 | Carr . | |
| 2,860,720 | 11/1958 | Huff et al. . | |
| 2,906,842 | 9/1959 | Brin | 74/522 |
| 2,908,183 | 10/1959 | Giovanni | 74/522 X |
| 2,936,867 | 5/1960 | Perry | 74/513 X |
| 3,151,499 | 10/1964 | Roe | 74/560 |
| 3,301,088 | 1/1967 | White . | |
| 3,319,487 | 5/1967 | Lystad et al. . | |
| 3,338,348 | 8/1967 | Roethlisberger et al. . | |
| 3,511,109 | 5/1970 | Tanaka . | |
| 3,563,111 | 2/1971 | Zeigler | 74/513 X |
| 3,643,524 | 2/1972 | Herring | 74/512 |
| 3,643,525 | 2/1972 | Gibas | 74/513 X |
| 3,691,868 | 9/1972 | Smith | 74/560 X |
| 3,765,264 | 10/1973 | Bruhn, Jr. | 74/512 |
| 3,975,972 | 8/1976 | Muhleck . | |
| 4,497,399 | 2/1985 | Kopich . | |

FOREIGN PATENT DOCUMENTS

| | | | |
|---|---|---|---|
| 2132753 | 1/1973 | Fed. Rep. of Germany | 74/560 |
| 2644628 | 12/1977 | Fed. Rep. of Germany . | |
| 2293342 | 7/1976 | France | 74/560 |
| 920784 | 3/1963 | United Kingdom | 74/560 |
| 952831 | 3/1964 | United Kingdom . | |

Primary Examiner—Gary L. Smith
Assistant Examiner—Rodney M. Lindsey
Attorney, Agent, or Firm—Krass & Young

[57] ABSTRACT

A control pedal apparatus for adjusting a control pedal of a motor vehcile such for example as a brake pedal or an accelerator pedal. The mechanism includes a pedal arm, an adjustor member, and a bracket secured to the fire wall of the vehicle. The mechanism allows the position of the pedal pad to be adjusted slidably on the adjustor member without disturbing the position of the particular control element actuated by the pedal assembly, and selectively moves the pivot axis of the pedal assembly to maintain a fixed mechanical advantage of the pedal assembly irrespective of the position of adjustment of the pedal arm on the adjustor member. Coacting, intersecting slots in the adjustor member and pedal arm allow the pivot axis to selectively move during adjustment of the assembly and fix the position of the pivot axis in any adjusted position of the pedal arm so that the pedal assembly pivots positively about the instantaneous assembly axis in any adjusted position of the pedal arm. One disclosed embodiment is intended for control of the push rod of the brake master cylinder and another disclosed embodiment is intended to control the throttle cable of the throttle mechanism. In each case, the adjustment of the pedal arm is accomplished by the rotation of a screw engaging a nut on the pedal arm with the screw being driven by a motor mounted on the bracket of the pedal assembly.

18 Claims, 2 Drawing Sheets

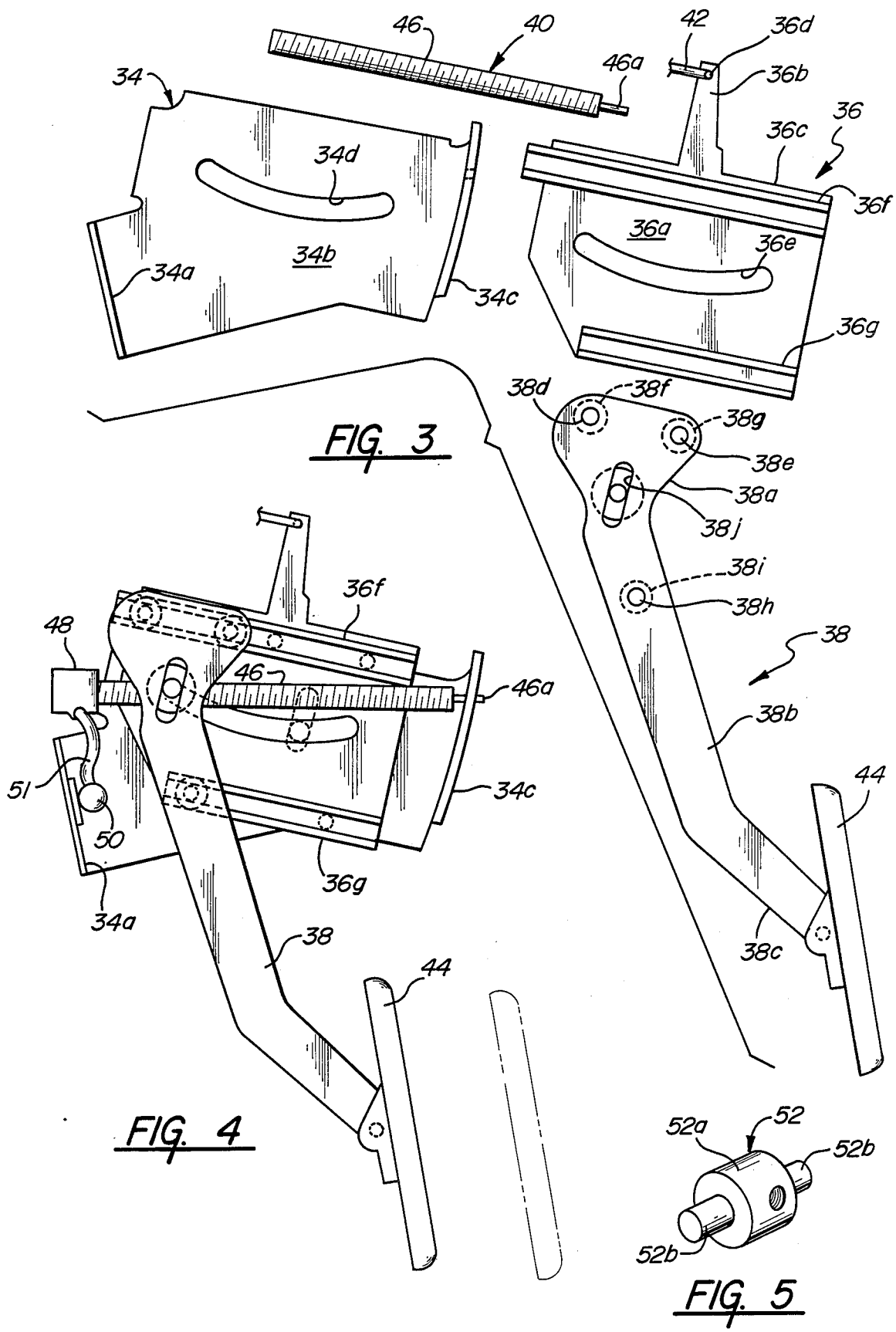

CONTROL PEDAL APPARATUS FOR A MOTOR VEHICLE

This is a continuation of co-pending application Ser. No. 897,197 filed on Aug. 18, 1986 now abandoned.

INTRODUCTION

This invention relates to control pedal apparatuses and more particularly to adjustment means for selectively adjusting the position of one or more of the control pedals of a motor vehicle.

BACKGROUND OF THE INVENTION

In a conventional automotive vehicle, pedals are provided for controlling brakes and engine throttle. If the vehicle has a manual transmission, a clutch pedal is also provided. These pedals are foot operated by the driver. In order for the driver to obtain the most advantageous position for working these controls, the vehicle front seat is usually slidably mounted on a seat track with means for securing the seat along the track in a plurality of adjustment positions.

The adjustment provided by moving the seat along the seat track does not accommodate all vehicle operators due to differences in anatomical dimensions. Further, there is growing concern that the use of seat tracks, and especially long seat tracks, constitutes a safety hazard in that the seat may pull loose from the track during an accident with resultant injuries to the driver and/or passengers. It is therefore desirable to either eliminate the seat track entirely or shorten the seat track to an extent that it will be strong enough to retain the seat during an impact. Shortening or eliminating the seat track requires that means be provided to selectively move the various control pedals to accommodate the various size drivers.

Various proposals have been made in the past to provide selective adjustment of the pedal positions to accommodate various size drivers but none of these prior art adjustment proposals has met with any significant commercial acceptance since the proposed mechanisms have been unduly complex and expensive, and/or have been extremely difficult to operate, and/or have accomplished the required pedal adjustment only at the expense of altering other critical dimensional relationships as between the driver and the various pedals.

SUMMARY OF THE INVENTION

This invention is directed to a control pedal mechanism in which the pedal position is readily adjusted without disturbing the essential dimensional relationships in the control environment.

The invention control pedal apparatus comprises a mounting bracket adapted to be mounted on the fire wall of the vehicle; a pedal assembly; pivot means mounting the upper end of the pedal assembly for pivotal movement on the bracket; a pedal pad mounted on the lower end of the pedal assembly; attachment means on the pedal assembly defining an attachment point for attachment of a control member for operation of a control system of the vehicle in response to pivotal movement of the pedal assembly upon the application of operator pressure to the pedal pad; and pedal adjustment means operative to selectively move the pedal pad relative to the bracket without moving the attachment point relative to the bracket. This arrangement allows the pedal to be selectively adjusted to suit the individual driver without disturbing the operative relationship of the control pedal assembly to the involved control member of the vehicle.

According to a further feature of the invention, the pedal adjustment means is further operative during the selective movement of the pedal pad relative to the bracket to maintain a fixed ratio between the distance from the pivot axis to the pedal pad and the distance from the pivot axis to the attachment point of the vehicular control member. This arrangement allows the pedal pad to be selectively adjusted without disturbing the optimal mechanical advantage previously built into the pedal system during the original ergonomic design of the vehicle.

According to a further feature of the invention, the pedal assembly includes a pedal arm and an adjustor member; the pedal pad is mounted on the lower end of the pedal arm; the attachment means for the control member of the vehicle is mounted on the adjustor member; the adjustor means comprises a pair of spaced pins on the pedal arm slidably guiding in spaced parallel tracks on the adjustor member, an oblique cam slot in the pedal arm, and mating generally vertical slots in the bracket and in the adjustment member intersecting the cam slot; and the pivot means comprises a pivot pin slidably received in the cam slot and in the matching slots in the bracket and in the adjustor member. With this arrangement, the pivot axis is moved upwardly and downwardly in response to sliding adjustment of the pedal arm on the adjustor member so as to selectively maintain the desired mechanical advantage originally built into the control pedal system.

According to a further feature of the invention, the pedal arm and adjustor member move relative to each other during the pedal adjustment but move as a single unit, in any position of relative adjustment of the pedal arm on the adjustor member, when pressure is applied to the pedal pad. This arrangement allows the pedal arm to be selectively adjusted on the adjustor member to provide the desired pedal pad position without disturbing the position of the vehicular control member secured to the adjustor member, and allows the pedal arm and adjustor member to connect positively and act in unison to positively control the vehicle irrespective of the relative positioning of the pedal arm on the adjustor member.

According to a further feature of the invention, a nut is carried by the pedal arm and a screw, extending generally in the direction of the tracks on the adjustor member, threadably engages the nut and is precluded from axial movement so that rotation of the screw causes the pins to slide in the tracks on the adjustor member to slidably adjust the pedal arm on the adjustor member. This arrangement provides an inexpensive and positive means of readily adjusting the pedal arm on the adjustor member.

In one disclosed embodiment of the invention in which the control member is a push rod controlling the master brake cylinder of the vehicle, the attachment means for the control member comprises pins secured to the adjustor member and received in an actuate slot in the bracket, the nut is rigidly secured to the pedal arm between the guide pins, and the slot in the pedal arm constitutes an obliquely extending slot in the upper end of the pedal arm coacting with matching generally vertical slots in the adjustor member and in the bracket so that as the screw is rotated the pedal arm adjusts slidably along the adjustor member and the pivot axis is moved selectively upwardly and downwardly to maintain the desired economically determined mechanical advantage in the brake pedal assembly.

In another embodiment of the invention in which the control member is a cable controlling the throttle of the vehicle, the pivot means comprises a pivot pin slidably received in the pedal arm slot and in the matching slots in the adjustor member and in the bracket, the nut is carried by the pivot pin, and the matching slots in the adjustor member and in the bracket are actuate and are centered on the attachment point of the throttle cable to the adjustor member. With this arrangement, rotation of the screw causes the pedal arm to slidably adjust on the adjustor member with the pivot pin and associated nut moving along an arc centered on the attachment point of the throttle cable so as not to disturb the throttle cable during the pedal adjustment process.

BRIEF DESCRIPTION OF THE DRAWINGS

FIG. 3 is an exploded view of a second embodiment of the control pedal apparatus of the invention suitable for use with an accelerator pedal;

FIG. 4 is an assembled view of the control pedal apparatus of FIG. 3; and

FIG. 5 is a perspective view of a screw pivot member employed in the control apparatus of FIGS. 3 and 4.

DETAILED DESCRIPTION OF THE PREFERRED EMBODIMENT

Figure 1:
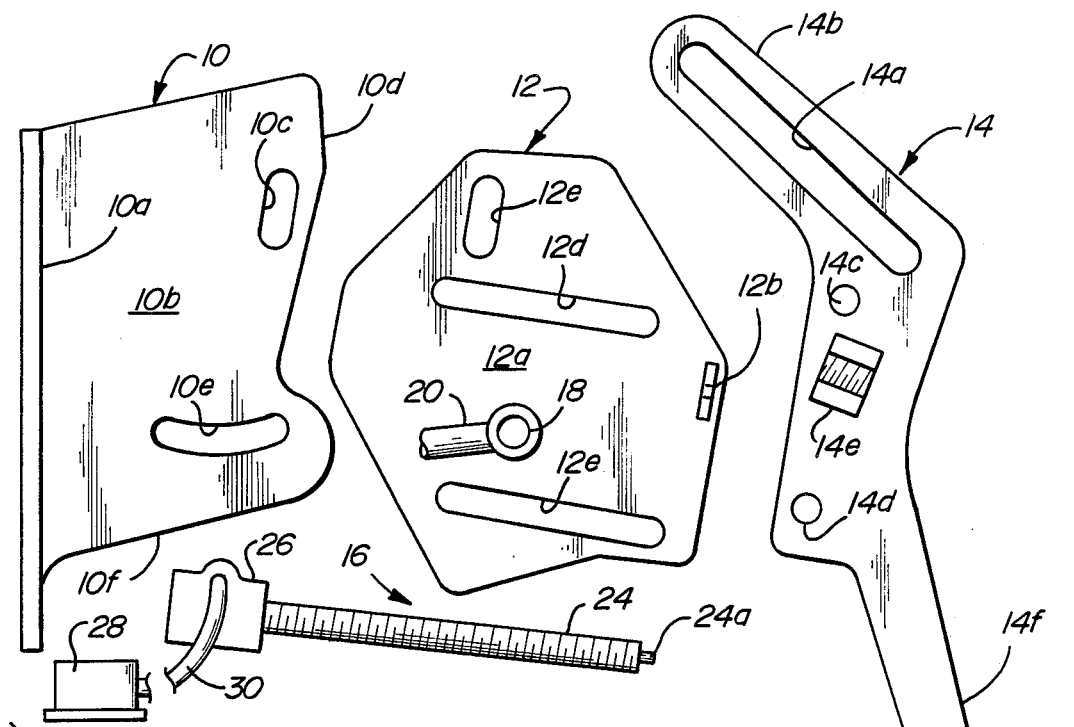
FIG. 1 is an exploded view of a first embodiment of the invention control pedal apparatus suitable for use with a brake pedal.
Figure 2:
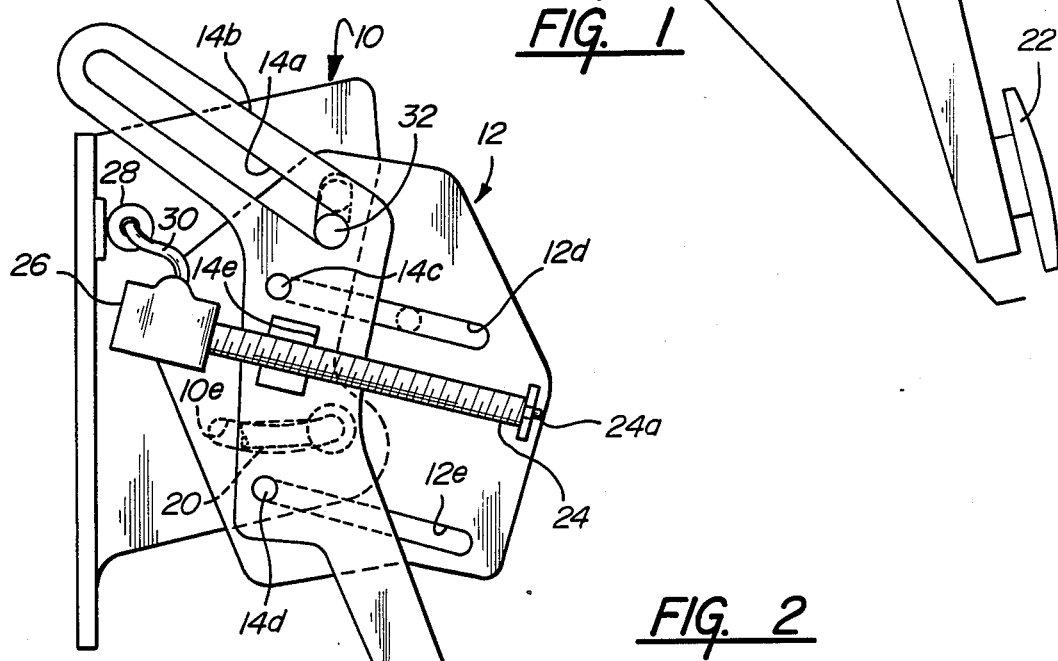
FIG. 2 is an assembled view of the control pedal apparatus of FIG. 1.

The brake pedal apparatus of FIGS. 1 and 2, broadly considered, comprises a bracket 10, an adjustor member 12, a pedal arm 14, and a screw assembly 16.

Bracket 10 is formed of a suitable metallic material and includes a flange portion 10a for attachment of the bracket to the fire wall of the motor vehicle and a main body portion 10b. A generally vertical slot 10c is formed in the upper portion of main body portion 10b adjacent its forward edge 10d. An actuate slot 10e is formed in main body portion 10b adjacent its lower edge 10f. Although bracket 10 is shown for simplicity as comprising a single plate member, in actuality bracket 10 would be fabricated as two laterally spaced identical plate members suitably rigidly joined together.

Adjustor member 12 is formed of a suitable metallic material and includes a main body portion 12a, a lug portion 12b, and a pin 18. Main body portion 12a is generally planar and defines an upper generally vertically extending slot 12c corresponding to slot 10c in bracket 10, and a pair of parallel generally horizontally extending straight slots 12d and 12e. Pin 18 extends normally from main body portion 12a between slots 12d and 12e and is sized to fit slidably in slot 10e in bracket 10. A brake master cylinder push rod 20 is pivotally mounted on pin 18 so that pin 18 defines an attachment point for the brake master cylinder control rod. Whereas adjustor member 12 is shown for simplicity as a single plate member, adjustor member 12 in actuality would be formed of two spaced identical members rigidly joined together and sized to fit in sandwich fashion between the two spaced plates of bracket 10.

Pedal arm 14 is formed of a suitable metallic material and includes an oblique slot 14a in the upper end 14b of the arm, a pair of vertically spaced pins 14c and 14d projecting laterally from the arm, a nut 14e rigidly secured to the arm between pins 14c and 14d, and a lower arm portion 14f. A brake pedal pad 22 is secured to the lower end of pedal arm 14. Pedal arm 14, as shown, comprises a single plate like member and is fitted in sandwich fashion between the spaced plates of adjustor member 12.

Screw assembly 16 comprises a screw 24, an adaptor member 26, and a motor 28. Screw 24 has a size and pitch to match the size and pitch of nut 14e on pedal arm 14 and includes a pilot portion 24a at its forward end journaling in a suitable bore in lug portion 12b of adjustor member 12. Adaptor member 26 mounts the rear end of screw 24 and functions in known manner to convert rotary movement of a flexible cable 30 connected to the output of a motor 28 into rotary movement of screw 24.

The various components of the control pedal apparatus of FIG. 1 are seen in assembled relation in FIG. 2. In assembled relation, pins 14c and 14d of pedal arm 14 are slidably received in slots 12d and slots 12e respectively of adjustor member 12; push rod pin 18 is slidably received in slot 10e of bracket 10; screw 24 is threadably received in nut 14e with pilot portion 24a journaling in lug portion 12b of adjustor member 12; motor 28 is mounted on bracket 10 with drive cable 30 drivingly connected to adaptor member 26; and a pivot pin 32 is slidably received in slots 14a, 12c and 10c. It will be understood that pivot pin 32 includes head portions at each end to preclude axial movement of the pin out of the slots.

In operation of the brake pedal apparatus of FIGS. 1 and 2, motor 28 is suitable actuated to rotate screw 24 which causes nut 14e to travel along the rotating screw to slidably move pedal arm 14 relative to adjustor member 12 with the precise direction of the relative movement defined by sliding movement of pins 14c and 14d in slots 12d and 12e. This sliding movement of pedal arm 14 on adjustor member 12 moves pedal 22 forwardly and rearwardly to economically accommodate drivers of various statures.

As pedal arm 14 slides relative to adapter member 12, pivot pin 32 moves cammingly upwardly in slots 10c and 12c by virtue of the camming action of oblique slot 14a in the pedal arm. Specifically, as pedal 22 is adjusted forwardly, pivot pin 32 is moved upwardly in slots 10c and 12b and as pedal pad 22 is adjusted rearwardly pivot pin 32 is moved downwardly in slots 10c and 12c. This upward and downward movement of pivot pin 32 in response to forward and rearward movement of the pedal pad has the effect of maintaining the ratio between the distance from the pivot axis defined by pivot pin 32 to pedal pad 22 and the distance from the pivot axis to the attachment point defined by push rod pin 18 substantially constant so that the mechanical advantage initially economically built into the brake pedal assembly is maintained in all positions of adjustment of the pedal arm relative to the adjustor member.

When operator pressure is applied to pedal pad 22 in any position of relative adjustment of pedal arm 14 on adjustor member 12, the pedal arm and adjustor member move as a single unit about the pivot axis defined by the instantaneous position of pivot pin 32 whereby to apply the brakes of the vehicle through the push rod 20. Since the adjustor member 12 does not move during the adjustment of pedal arm 14 on the control member 12, the attachment point defined by push rod pin 18 is not moved during the adjustment process so that the critical interrelationship between the push rod and the brake master cylinder is not disturbed. In FIG. 2, a rearwardly adjusted position of pedal arm 14, together with the corresponding positions of pivot pin 32 and pins 14c and 14d, are shown in solid lines whereas adjusted positions of these elements, corresponding to a relatively forward position of pedal pad 22, are shown in dotted lines.

The accelerator pedal adjustment mechanism seen in FIGS. 3 and 4 is similar in many respects to the brake pedal adjustment mechanism of FIGS. 1 and 2 and, like the brake pedal mechanism, includes a bracket 34, an adjustor member 36, a pedal arm 38, and a screw assembly 40.

Bracket 34 is formed of a metallic material and includes a flange portion 34a for attachment of the bracket to the fire wall of the motor vehicle; a main body portion 34b; a forward flange portion 34c; and an actuate slot 34d. Although bracket 34 is shown for simplicity as a single plate member, in actuality bracket 34 would comprise two laterally spaced identical plates rigidly secured together.

Adjustment member 36 is formed of a metallic material and includes a main body portion 36a and a lug portion 36b upstanding from the upper edge 36c of main body portion 36a and defining an attachment point 36d for securement of the control cable 42 for the throttle system of the vehicle. An arcuate slot 36e, centered on attachment point 36d and corresponding in radius and configuration to slot 34d in bracket 34, is provided in main body portion 36a, and upper and lower tracks 36f and 36g are secured to main body portion 36a adjacent the upper and lower edges of the adjustor member and extending in generally horizontal, parallel relation.

Pedal arm 38 includes an upper portion 38a, an intermediate portion 38b, and a lower portion 38c. Upper portion 38a is triangulated and includes a pair of spaced pins 38d and 38e at the upper apexes of upper portion 38a and respectively journaling guide rollers 38f and 38g.

A third guide pin 38h is provided in the intermediate portion 38b of the pedal arm and journals a guide roller 38i. A vertically extending slot 38j is provided in the pedal arm between upper guide pins 38d and 38e and lower guide pins 38h. An accelerator pedal pad 44 is pivotally secured to the lower end of the pedal arm.

Screw assembly 40 includes a screw 46 including a pilot portion 46a, an adaptor 48 receiving the rearward end of the screw, and a motor 50 driving adapter member 48 through a flexible drive cable 51.

In the assembled relation of the control apparatus of FIG. 3, as seen in FIG. 4, guide rollers 38f and 38g are rollably received in upper track 36f of the adjustor member; guide roller 38i is rollably received in lower track 36g of the adjustor member; bracket flange 34a is suitably secured to the fire wall of the vehicle; motor 50 is suitably secured to bracket 34; pilot portion 46a of screw 46 is journaled in flange portion 34c of the bracket; and a screw pivot member 52, seen in detail in FIG. 5, is received in aligned slots 38a, 34d and 36e. Screw pivot member 52 includes a central nut portion 52a threadably receiving screw 46 and pivot pin portions 52b suitably received in the slots 34d of the spaced plates comprising the bracket 34 and suitably received in adjustor member slot 36e and pedal arm slot 38j.

In the operation of the accelerator pedal mechanism of FIGS. 3-5, motor 50 is suitably actuated to rotate screw 46 and thereby move pedal arm 38 along adjustor member 36 with the precise direction of the movement determined by the rolling, guiding movement of guide rollers 38d, 38g and 38i in tracks 36f and 36g. As the pedal arm moves rollably and slidably along adjustor member 36, accelerator pedal 44 is selectively adjusted to suit the ergonomic requirements of the particular driver. When operator pressure is applied to accelerator pedal 44 in any adjusted position of pedal arm 38 relative to adjustor member 36, the pedal arm and adjustor member pivot as a single unit about the axis defined by pivot screw 52 to suitably move the control cable 42 controlling the throttle mechanism of the vehicle. As the pedal arm moves slidably and adjustably along adjustor member 36, pivot portions 52b of screw pivot 52 move slidably along aligned slots 34d and 36e and, concurrently, move vertically relative to slot 38j. Since slots 34d and 36e are centered on attachment point 36d, the attachment point does not move during the adjustment of the pedal arm relative to the adjustor member so that the cable 42 controlling the throttle mechanism of the vehicle is not disturbed.

Since the aligned slots 34d, 36e and the vertical slot 38j intersect each other and are angularly disposed with respect to each other, the pivot portions 52b of screw 52 are always bearing on four points of the intersecting slots so that the position of the screw pivot is fixed in any position of adjustment of the pedal arm relative to the adjustor member so that, when pressure is applied to the accelerator pad, the pedal arm and adjustor member will pivot as a single unit about the instantaneous axis defined by the screw pivot.

The invention control pedal adjustment mechanism will be seen to provide a simple and efficient means of readily adjusting the control pedal to suit the particular ergonomic requirements of the particular driver without disturbing the other critical dimensional relationships between the pedal assembly and the related control elements of the motor vehicle.

Whereas preferred embodiments of the invention have been illustrated and described in detail it will be apparent that various changes may be made in the disclosed embodiments without departing from the spirit or scope of the invention.

I claim:

1. A control pedal apparatus for a motor vehicle comprising:

(A) a mounting bracket adapted to be mounted on a fixed structure of the vehicle;

(B) a pedal assembly including an elongated pedal arm and an adjacent member;

(C) pivot means mounting the upper end of said pedal assembly for pivotal movement on said bracket about a pivot axis;

(D) a pedal pad mounted on the lower end of said pedal arm;

(E) attachment means on said adjustor member defining an attachment point for attachment of a control member for operation of a control system of the vehicle in response to pivotal movement of said pedal assembly upon the application of operator pressure to said pedal pad;

(F) a pair of pins on said pedal arm spaced longitudinally along the length of said pedal arm;

(G) a pair of parallel tracks on said adjustor member respectively slidably receiving said pins;

(H) a nut carried b said pedal arm at a location therealong between said pins; and (I) a screw positioned between said tracks and extending generally in a direction of said tracks, threadably engaging said nut, and operative in response to rotation of said screw to cause said pins to slide in said tracks to slidably adjust said pedal arm on said adjustor member so as to selectively move said pedal pad relative to said bracket without moving said attachment point relative to said bracket.

2. A control pedal apparatus for a motor vehicle comprising:
(A) a mounting bracket adapted to be mounted on a fixed structure of the vehicle;
(B) a pedal assembly including a pedal arm and an adjustor member;
(C) pivot means mounting the upper end of said pedal assembly for pivotal movement on said bracket about a pivot axis;
(D) a pedal pad mounted on the lower end of said pedal arm;
(E) attachment means on said adjustor member defining an attachment point for attachment of a control member for operation of a control system of the vehicle in response to pivotal movement of said pedal assembly upon the application of operator pressure to said pedal pad;
(F) pedal adjustor means operative to selectively move said pedal pad relative to said bracket without moving said attachment point relative to said bracket, said adjustor means comprising a pair of spaced pins on said pedal arm, a pair of parallel tracks on said adjustor member respectively slideably receiving said pins, a nut carried by said pedal arm, and a screw extending generally in the direction of said tracks, threadably engaging said nut and operative in response to rotation of said screw to cause said pins to slide in said tracks to slideably adjust said pedal arm on said adjustor member;
(F) a slot in the upper end of said pedal arm;
(G) matching slots in said adjustor member and in said bracket intersecting said pedal arm slot and extending in a direction at an angle to the direction of said pedal arm slot; and
(H) a pivot pin constituting said pivot means and slideably received in said pedal arm slot and in said matching slots.

3. A control pedal apparatus according to claim 2 wherein:
(P) said nut is carried by said pivot pin.

4. A control pedal apparatus according to claim 3 wherein:
(Q) said matching slots are arcuate with said attachment point as a center.

5. A control pedal apparatus according to claim 4 wherein:
(R) said pedal assembly comprises an accelerator pedal assembly; and
(S) said control member comprises a cable controlling the supply of fuel to the engine of the vehicle.

6. A control pedal apparatus according to claim 2 wherein:
(P) said nut is rigidly secured to said pedal arm between said pins.

7. A control pedal apparatus according to claim 2 wherein:
(P) said pedal arm slot is provided in the upper end of said pedal arm and extends obliquely; and
(Q) said matching slots extend generally vertically.

8. A control pedal apparatus according to claim 7 wherein:
(R) said attachment means comprises a pin secured to said adjustor member and received in an arcuate slot in said bracket and said control member comprises a push rod operatively associated with the master brake cylinder of the vehicle.

9. A control pedal apparatus for a motor vehicle comprising:
(A) a mounting bracket adapted to be mounted on a fixed structure of the vehicle;
(B) a pedal assembly;
(C) pivot means mounting the upper end of said pedal assembly for pivotal movement on said bracket about a pivot axis;
(D) a pedal pad mounted on the lower end of said pedal assembly;
(E) attachment means on said pedal assembly defining an attachment point for attachment of a control member for operation of a control system of the vehicle in response to pivotal movement of said pedal assembly upon the application of operator pressure to said pedal pad; and
(F) pedal adjustor means operative to selectively move said pedal pad relative to said bracket without moving said attachment point relative to said bracket and being further operative during such relative movement of said pedal pad relative to said bracket to maintain a substantially constant ratio between the distance from said pivot axis to said pedal pad and the distance from said pivot axis to said attachment point, said adjustor means comprising compensator means moving said pivot axis upwardly and downwardly in response to movement of said pedal pad relative to said bracket.

10. A control pedal apparatus according to claim 9 wherein:
(I) said pedal assembly includes a pedal arm and an adjustor member;
(J) said pedal pad is mounted on the lower end of said pedal arm;
(K) said attachment means is on said adjustor member;
(L) said adjustment means comprises
  (1) a pair of spaced pins on said pedal arm slidably guiding in spaced parallel tracks on said adjustor member,
  (2) an oblique cam slot in said pedal arm, and
  (3) matching generally vertical slots in said bracket and in said adjustor member intersecting said cam slot; and
(M) said pivot means comprises a pivot pin slidably received in said cam slot and in said matching slots.

11. A control pedal apparatus for a motor vehicle comprising:
(A) a mounting bracket member adapted to be mounted on a fixed structure of the vehicle;
(B) an adjustor member;
(C) means mounting said adjustor member for pivotal movement relative to said bracket member about a pivot axis;
(D) a pedal assembly including a pedal arm member;
(E) pedal arm adjusting means mounting said pedal arm member on said adjustor member for adjusting movement relative to said adjustor member;
(E) means mounting said pedal arm member for pivotal movement relative to said bracket member about said pivot axis; and (G) compensator means operative in response to relative movement between said members to adjustably move said pivot axis.

12. A control panel apparatus according to claim 11 wherein:
(H) said compensator means is operative to move said pivot axis in response to adjusting movement of said pedal arm member relative to said adjustor member.

13. A control pedal apparatus according to claim 12 wherein:
(I) said apparatus further includes attachment means on said adjustor member defining an attachment point for attachment of a control member for operation of a control system of the vehicle in response to pivotal movement of said pedal arm member about said pivot axis; and
(J) said attachment point is not moved in response to operation of said pedal arm adjusting means.

14. A control pedal apparatus according to claim 13 wherein:
(K) said pivot axis is defined by a pivot pin; and
(L) said compensator means comprises coacting slots receiving said pivot pin and arranged in intersecting relation to each other so as to cammingly move said pivot pin in response to adjusting movement of said pedal arm member relative to said adjustor member.

15. A control pedal apparatus for a motor vehicle comprising:
(A) a mounting bracket adapted to be mounted on a fixed structure of the vehicle;
(B) a pedal assembly including an elongated pedal arm and an adjustor member;
(C) pivot means on said pedal arm mounting the upper end of said pedal arm for pivotal movement on said brake about a pivot axis;
(D) a pedal pad mounted on the lower end of said pedal arm;
(E) attachment means on said adjustor member defining an attachment point for attachment of a control member for operation of a control system of the vehicle in response to pivotal movement of said pedal assembly upon the application of operator pressure to said pedal pad;
(F) guide means on said pedal arm spaced longitudinally along the length of said pedal arm from said pivot axis;
(G) track means on said adjustor means slidably receiving said guide means;
(H) a nut carried by said pedal arm; and
(I) a screw extending generally in the direction of said track means, threadably engaging said nut, and operative in response to rotation of said screw to cause said guide means to slide in said track means, to slidably adjust said pedal arm on said adjustor member so as to selectively move said pedal pad relative to said bracket without moving said attachment point relative to said bracket.

16. A control pedal apparatus for a motor vehicle comprising:
(A) a mounting bracket adapted to be mounted on a fixed structure of the vehicle;
(B) a pedal assembly including a pedal arm and an adjustor member;
(C) pivot member means mounting said pedal assembly for pivotal movement on said bracket about a pivot axis;
(D) a pedal pad mounted on the lower end of said pedal arm;
(E) attachment means on said adjustor member defining an attachment point for attachment of a control member for operation of a control system of the vehicle in response to pivotal movement of said pedal assembly upon the application of operator pressure to said pedal pad;
(F) pedal adjustor means operative to selectively move said pedal arm relative to said adjustor member;
(G) matching slots in said adjustor member and in said bracket;
(H) means defining a further slot intersecting said matching slots; and
(I) a pivot pin constituting said pivot means and slidably received in said further slot and in said matching slots 17. A control pedal apparatus for a motor vehicle comprising:
(A) mounting bracket adapted to be mounted on the fire wall of a vehicle;
(B) a pedal assembly including an adjustor member and an elongated pedal arm mounted on said adjustor member;
(C) pivot means mounting the upper end of said pedal assembly for pivotal movement on said bracket about a pivot axis;
(D) a pedal pad mounted on the lower end of said pedal arm;
(E) attachment means on said adjustor member defining an attachment point for attachment of a control member for operation of a control system of the vehicle in response to pivotal movement of said pedal assembly upon the application of operator pressure to said pedal pad; and
(F) pedal adjustor means including means operative to selectively move said pedal arm relative to said adjustor member and means operative in response to movement of said pedal arm relative to said adjustor member to move said pivot axis relative to said bracket.

18. A control pedal apparatus for a motor vehicle comprising:
(A) a mounting bracket adapted to be secured to a fixed structure of the vehicle;
(B) a pedal assembly pivotally mounted on said bracket and including a pedal arm and an adjustor member;
(C) a pedal pad secured to the lower end of said pedal arm;
(D) means mounting said pedal arm for sliding adjustment on said adjustor member and mounting said pedal arm and adjustor member for joint pivotal movement on said bracket in any position of sliding adjustment of said pedal arm on said adjustor member in response to operator pressure on said pedal pad; said mounting means comprising pair of spaced pins on said pedal arm slideably guiding in spaced tracks on said adjustor member, coacting intersecting angularly related slots in said adjustor member and in said pedal arm, and a pivot pin slideably received in said coacting slots.

* * * * *

UNITED STATES PATENT AND TRADEMARK OFFICE
CERTIFICATE OF CORRECTION

PATENT NO. : 4,875,385

DATED : October 24, 1989

INVENTOR(S) : Gabriel M. Sitrin

It is certified that error appears in the above-identified patent and that said Letters Patent is hereby corrected as shown below:

In the Abstract, line 2, delete "vehcile" and insert --vehicle--.

Column 2, line 61, delete "actuate" and insert --arcuate--.

Column 3, line 2, delete "economically" and insert --ergonomically--.

Column 3, line 10, delete "actuate" and insert --arcuate--.

Column 3, line 43, delete "actuate" and insert --arcuate--.

Column 4, line 40, delete "economically" and insert --ergonomically--.

Column 4, line 56, delete "economically" and insert --ergonomically--.

UNITED STATES PATENT AND TRADEMARK OFFICE
CERTIFICATE OF CORRECTION

PATENT NO. : 4,875,385

DATED : October 24, 1989

INVENTOR(S) : Gabriel M. Sitrin

It is certified that error appears in the above-identified patent and that said Letters Patent is hereby corrected as shown below:

Column 5, line 18, delete "actuate" and insert --arcuate--.

Column 6, line 65, delete "b" and insert --by--.

Column 7, line 37, delete "(F)" and insert --(G)--.

Column 7, line 38, delete "(G)" and insert --(H)--.

Column 7, line 42, delete "(H)" and insert --(I)--.

Column 7, line 47, delete "(P)" and insert --(J)--.

Column 7, line 50, delete "(Q)" and insert --(K)--.

Column 7, line 54, delete "(R)" and insert --(L)--.

Column 7, line 56, delete "(S)" and insert --(M)--.

Column 7, line 60, delete "(P)" and insert --(J)--.

Column 7, line 64, delete "(P)" and insert --(J)--.

Column 7, line 66, delete "(Q)" and insert --(K)--.

Column 8, line 1, delete "(R)" and insert --(L)--.

UNITED STATES PATENT AND TRADEMARK OFFICE
CERTIFICATE OF CORRECTION

PATENT NO. : 4,875,385
DATED : October 24, 1989
INVENTOR(S) : Gabriel M. Sitrin

It is certified that error appears in the above-identified patent and that said Letters Patent is hereby corrected as shown below:

Column 8, line 26, delete "relative" and insert --selective--.

Column 8, line 37, delete "(I)" and insert --(G)--.

Column 8, line 39, delete "(J)" and insert --(H)--.

Column 8, line 41, delete "(K)" and insert --(I)--.

Column 8, line 43, delete "(L)" and insert --(J)--.

Column 8, line 51, delete "(M)" and insert --(K)--.

Column 8, line 66, delete "E)" and insert --F)--.

Column 9, line 49, delete "means" and insert --member--.

Column 10, line 1, after "pivot" delete --member--.

Column 10, lines 24 and 25, delete "the firewall" and insert --a fixed structure--.

UNITED STATES PATENT AND TRADEMARK OFFICE
CERTIFICATE OF CORRECTION

PATENT NO. : 4,875,385
DATED : October 24, 1989
INVENTOR(S) : Gabriel M. Sitrin

It is certified that error appears in the above-identified patent and that said Letters Patent is hereby corrected as shown below:

Column 10, line 25, delete "a" and insert --the--.

Signed and Sealed this

Fifteenth Day of January, 1991

Attest:

HARRY F. MANBECK, JR.

*Attesting Officer*     Commissioner of Patents and Trademarks